US011507865B2

(12) United States Patent
Barra

(10) Patent No.: US 11,507,865 B2
(45) Date of Patent: Nov. 22, 2022

(54) MACHINE LEARNING DATA CLEANING

(71) Applicant: Dell Products L.P., Round Rock, TX (US)

(72) Inventor: Ally Junio Oliveira Barra, Cork (IE)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 16/943,901

(22) Filed: Jul. 30, 2020

(65) Prior Publication Data

US 2022/0036220 A1 Feb. 3, 2022

(51) Int. Cl.
*G06F 3/048* (2013.01)
*G06N 5/04* (2006.01)
*G06N 20/00* (2019.01)

(52) U.S. Cl.
CPC ............ *G06N 5/043* (2013.01); *G06N 20/00* (2019.01)

(58) Field of Classification Search
CPC ............................... G06N 5/043; G06N 20/00
See application file for complete search history.

(56) References Cited

U.S. PATENT DOCUMENTS

| 11,263,323 | B2* | 3/2022 | Anders | G06K 9/6267 |
| 11,423,072 | B1* | 8/2022 | Chen | G06F 16/51 |
| 11,436,497 | * | 9/2022 | Choi | G06N 3/0454 |
| 2015/0379424 | A1* | 12/2015 | Dirac | G06N 20/00 706/12 |
| 2019/0354810 | A1* | 11/2019 | Samel | G06N 3/04 |
| 2020/0167660 | A1* | 5/2020 | Krishnan | G06N 20/20 |
| 2021/0034980 | A1* | 2/2021 | Xia | G06N 3/0454 |
| 2022/0036220 | A1* | 2/2022 | Barra | G06N 20/00 |

OTHER PUBLICATIONS

Kubeflow, Overview—ML workflow, https://www.kubeflow.org/docs/started/kubeflow-overview/, accessed Jul. 29, 2020.
PYPI, Impyute—Project description, https://pypi.org/project/impyute/, accessed Jul. 30, 2020.
Impyute, Impyute documentation, https://impyute.readthedocs.io/en/master/, accessed Jul. 30, 2020.

* cited by examiner

*Primary Examiner* — David Phantana-angkool
(74) *Attorney, Agent, or Firm* — Jackson Walker L.L.P.

(57) ABSTRACT

An information handling system may be configured to: receive time-series data regarding measurements of a physical variable; determine that a missing data point is missing from the time-series data, wherein the missing data point corresponds to a particular day of the week; in response to a determination that earlier corresponding data from the particular day of the week of an earlier week is available, copy the earlier corresponding data to replace the missing data; in response to a determination that later corresponding data from the particular day of the week of a later week is available, copy the later corresponding data to replace the missing data; and in response to a determination that neither the earlier corresponding data nor the later corresponding data is available, perform interpolation to replace the missing data.

19 Claims, 5 Drawing Sheets

MACHINE LEARNING DATA CLEANING

TECHNICAL FIELD

The present disclosure relates in general to information handling systems, and more particularly to the management of machine learning systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system).

Various embodiments of this disclosure may be applied in the field of HCI systems. Further, some embodiments of this disclosure may be implemented using one or more cloud platforms such as Pivotal Cloud Foundry (PCF), etc.

Some embodiments of this disclosure may employ artificial intelligence (AI) techniques such as machine learning, deep learning, natural language processing (NLP), etc. Generally speaking, machine learning encompasses a branch of data science that emphasizes methods for enabling information handling systems to construct analytic models that use algorithms that learn interactively from data. It is noted that, although disclosed subject matter may be illustrated and/or described in the context of a particular AI paradigm, such a system, method, architecture, or application is not limited to those particular techniques and may encompass one or more other AI solutions.

Particularly in the field of machine learning, but also in other fields, the problem of missing data is relatively common and can have a significant effect on the conclusions that can be drawn from the data. Further, the lost data can cause biases in the estimation of parameters. It can also reduce the representativeness of the samples.

For example, when working on time-series problems, missing data can cause significant loss in the effectiveness of machine learning models for prediction. There are many factors that can contribute to this lack of information, such as network issues, database issues, collector agent issues, etc.

It may be important to decide whether a missing point in time should have a value at all (as might be the case of servers that function 24×7), or whether the gap should not be filled (e.g., the model should learn about the gap).

Missing data may generally fall into several categories. For example, data may be "missing at random" (MAR), which means that the propensity for a data point to be missing is not related to the missing data, but it may be related to some other observed data. Data may also be "missing completely at random" (MCAR), which means that the fact that a certain value is missing has nothing to do with its hypothetical value or with the values of other variables.

Finally, data may be "missing not at random" (MNAR). For example, the missing value may depend on the hypothetical value (e.g., people with high salaries may be less likely to want to reveal their incomes in surveys). Alternatively, the missing value may depend on some other variable's value (e.g., women may be less likely to want to reveal their ages, so that the missing value in age variable is impacted by the gender variable).

In the case of MAR or MCAR, it is safe to remove the data with missing values depending upon their occurrences, while in the case of MNAR, removing observations with missing values can produce a bias in the model. Accordingly, care is needed before removing observations, although in some cases imputation may not necessarily give better results.

For purposes of this disclosure, the situation of collecting telemetry information about the operation of information handling systems (e.g., servers) that normally work 24×7 is examined. Accordingly, the question becomes how to determine the best way to fill gaps to extract better results from models.

Embodiments of this disclosure may provide improved methods for cleaning data such as time-series data by filling in gaps.

It should be noted that, although this disclosure describes the example of HCI systems and PCF in detail for the sake of clarity and exposition, various aspects of this disclosure may in some embodiments be applied to traditional datacenters, individual compute/storage/networking devices, virtual machines, etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of machine learning systems may be reduced or eliminated.

In accordance with embodiments of the present disclosure, an information handling system may include at least one processor and a non-transitory memory coupled to the at least one processor. The information handling system may be configured to: receive time-series data regarding measurements of a physical variable; determine that a missing data point is missing from the time-series data, wherein the missing data point corresponds to a particular day of the week; in response to a determination that earlier corresponding data from the particular day of the week of an earlier week is available, copy the earlier corresponding data to replace the missing data; in response to a determination that later corresponding data from the particular day of the week of a later week is available, copy the later corresponding data to replace the missing data; and in response to a determination that neither the earlier corresponding data nor the later corresponding data is available, perform interpolation to replace the missing data.

In accordance with these and other embodiments of the present disclosure, a method may include an information handling system receiving time-series data regarding measurements of a physical variable; the information handling system determining that missing data points are missing from the time-series data, wherein the missing data points correspond to particular days of the week; and, for each missing data point of the missing data points, the information handling system: in response to a determination that earlier corresponding data from the particular day of the week of an earlier week is available, copying the earlier corresponding data to replace the missing data; in response to a determination that later corresponding data from the particular day of the week of a later week is available, copying the later corresponding data to replace the missing data; and in response to a determination that neither the earlier corresponding data nor the later corresponding data is available, performing interpolation to replace the missing data.

In accordance with these and other embodiments of the present disclosure, an article of manufacture may include a non-transitory, computer-readable medium having computer-executable code thereon that is executable by an information handling system for: receiving time-series data regarding measurements of a physical variable; determining that a missing data point is missing from the time-series data, wherein the missing data point corresponds to a particular day of the week; in response to a determination that earlier corresponding data from the particular day of the week of an earlier week is available, copying the earlier corresponding data to replace the missing data; in response to a determination that later corresponding data from the particular day of the week of a later week is available, copying the later corresponding data to replace the missing data; and in response to a determination that neither the earlier corresponding data nor the later corresponding data is available, performing interpolation to replace the missing data.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
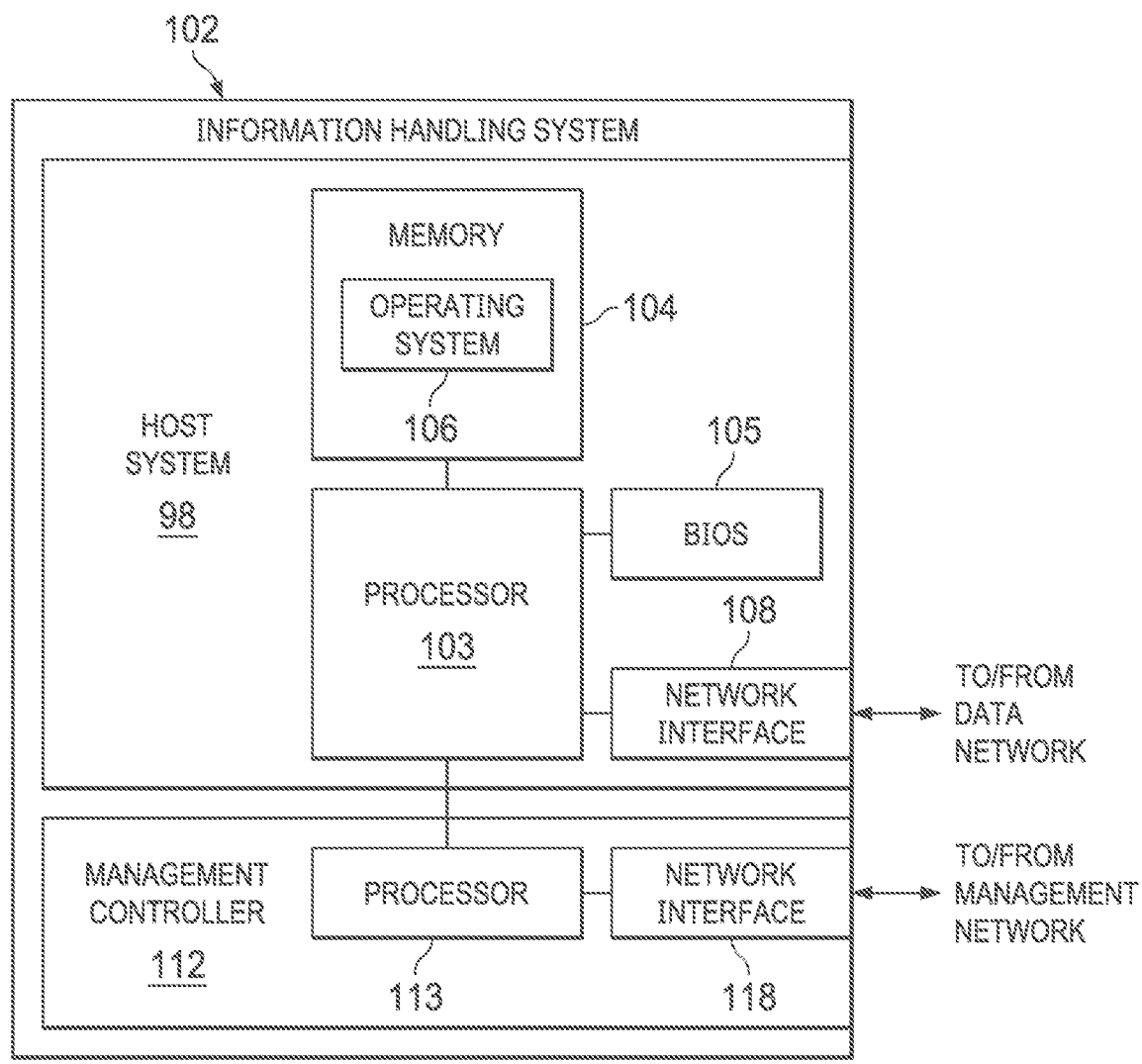
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide improved methods for cleaning data such as time-series data by filling in gaps. In time-series data, if there are missing values, there are generally two ways to deal with the incomplete data. First, the entire record that contains missing information may be omitted. Second, the missing information may be imputed. Since the time-series data has temporal properties, only some statistical methodologies are appropriate for imputing missing values in time-series data.

As further discussed above, missing data may be MAR, MCAR, and/or MNAR. In the case of MAR or MCAR, it is generally safe to remove the data with missing values, while in the case of MNAR, removing observations with missing values can produce a bias in the model. In some embodiments, the determination regarding MAR, MCAR, or MNAR may be made via one or more standard statistical methods; in other embodiments, a user may determine the nature of the missing data and provide instructions to the data cleaning system. For example, the user may instruct the system that the missing data is MNAR, and the system may then attempt to fill in missing values to avoid bias.

Figure 2:
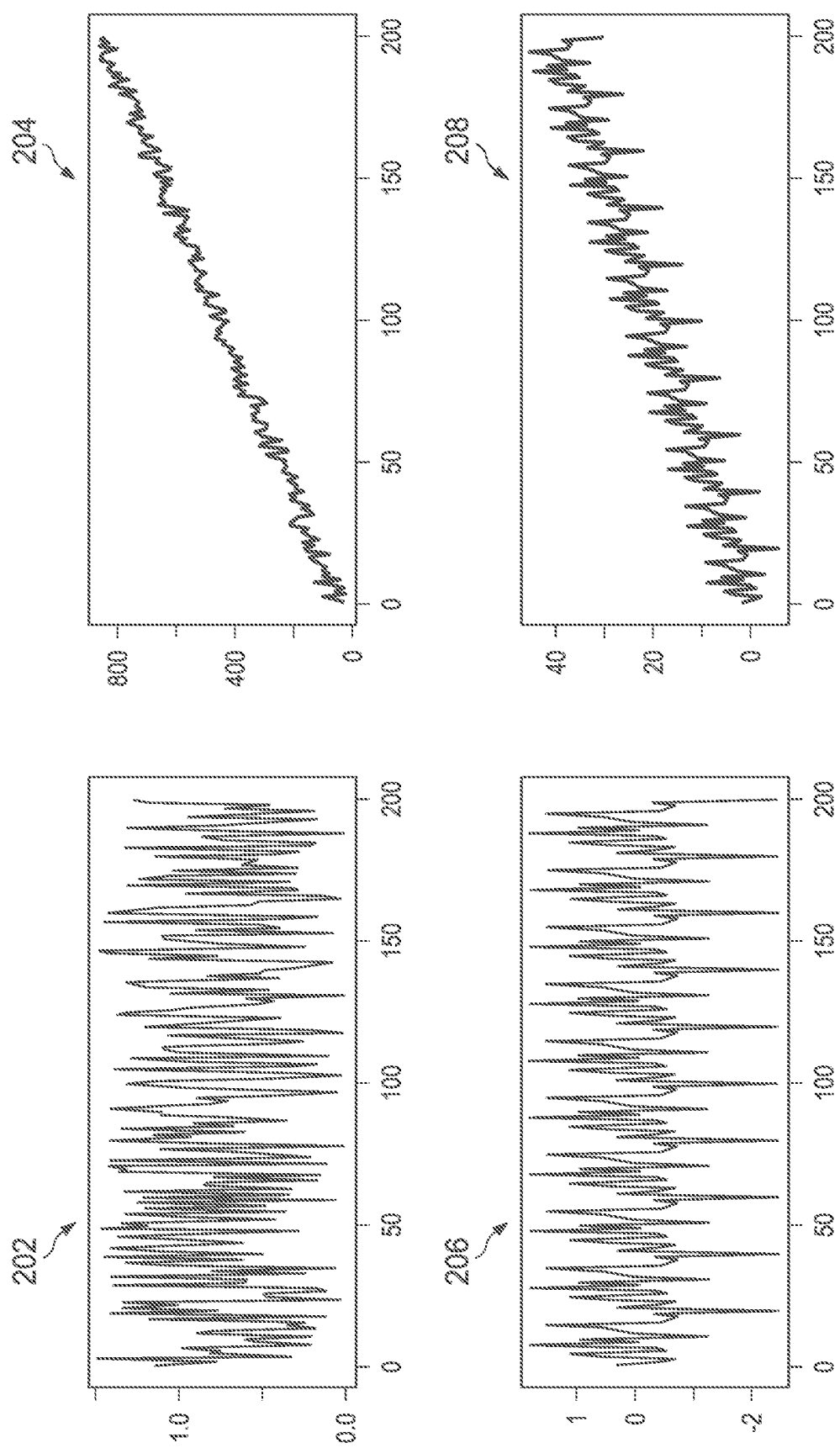
FIG. 2 illustrates examples of time-series data, in accordance with embodiments of the present disclosure.

Turning now to FIG. 2, four examples are shown of different types of time-series data that may be encountered in practice. In these examples, time is on the horizontal axis, and measured values (arbitrary units) are on the vertical axis.

In general, time-series data may be classified by decomposing it with a linear regression model. For example, the following equation may be used to break the data down to extract a trend and a seasonality:

$$Y(t)=m(t)+s(t)+\epsilon(t)$$

where t is time, Y is the variable being measured, m indicates a trend, s indicates seasonality, and $\epsilon$ indicates randomness. For example, m(t) may be a linear function of t, and s(t) may be a periodic function of t.

Based on the equation above, the four example sets of time-series data shown in FIG. 2 may be classified. Example 202 exhibits no trend or seasonality (e.g., it is pure noise such as white noise). Example 204 exhibits a trend (increasing over time), but it has no seasonality. Example 206 exhibits seasonality (periodicity), but it has no overall trend. Example 208 exhibits both a trend and seasonality.

To treat missing data in a dataset, a process may be employed that combines different techniques to fill the gaps. For example, consider the case of time-series data for some physical variable that might be observed in a server computer system. For example, variables such as temperature, fan speed, vibration level, CPU utilization, memory utilization, disk utilization, etc. might be examined.

According to one embodiment, all values less than zero may first be removed, because it does not make sense to have negative values for such variables. A negative value may thus be considered an error in the data acquisition. (In the case of temperature or other types of variables for which negative values are possible, this step may be omitted.)

After removing negative values, the data may be filtered to determine any days that have incomplete data. For each incomplete day, the same day of the week in past weeks may be examined. If a corresponding day in the past is found that is not missing the data, then the gap may be filled with the observations from that prior day. (If more than one such day is found, in some embodiments, the most recent such day may be used to reduce the effect of long-term trends.) If no such complete day is found in the past, then the same day of the week in a future week may be examined. If a day in the future is found that is not missing the data, then the gap may be filled with the observations from the day subsequent to the incomplete day. (If more than one such day is found, in some embodiments, the earliest such day may be used to reduce the effect of long-term trends.)

If no corresponding complete day is found before or after the incomplete day, then interpolation may be used to fill in the data for the incomplete day. This process is discussed in more detail below with regard to FIG. 5.

Figure 3:
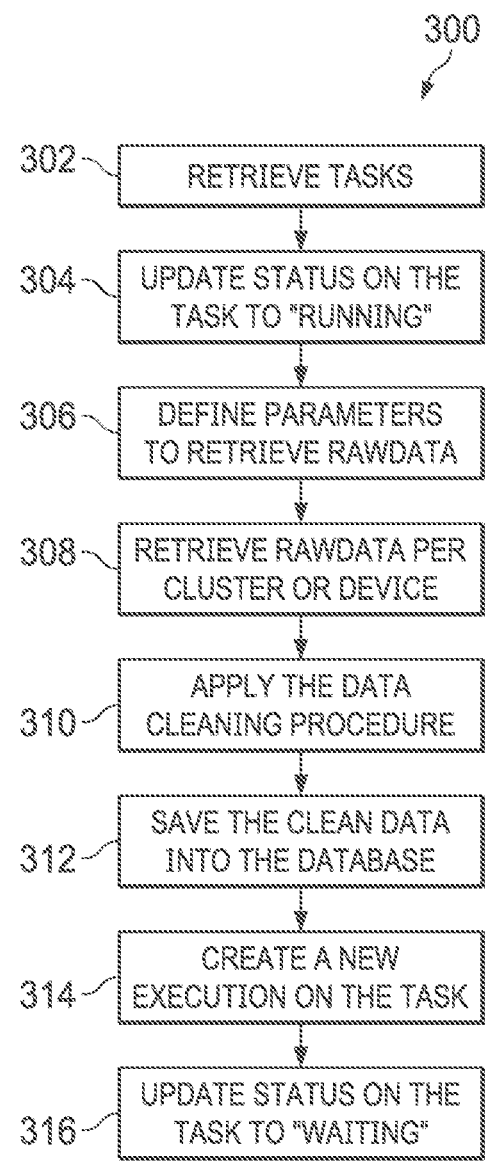
FIG. 3 illustrates an example method, in accordance with embodiments of the present disclosure.

Turning now to FIG. 3, a flow chart is shown of an example method 300 for operating a machine learning data cleaning system, in accordance with some embodiments of this disclosure. At step 302, a task may be retrieved by the system. At step 304, a status flag or variable for the task may be updated to a "running" status.

At step 306, parameters may be defined for the retrieval of raw data. For example, some embodiments may analyze parameters relating to telemetry of server information handling systems. Such parameters may include temperature, fan speed, vibration level, CPU utilization, memory utilization, disk utilization, etc.

At step 308, the raw data may be retrieved based on the relevant parameters. In some embodiments, telemetry data may be collected via a software agent that executes on various systems within a datacenter (e.g., management controllers and/or host systems) and collects telemetry, which is then sent to the manufacturer's cloud systems for analysis.

At step 310, various data cleaning procedures as discussed herein may be applied to the data. For example, as discussed in further detail below, missing data in time-series data may be filled in. The cleaned data may then be stored in a database at step 312.

At step 314, a new execution entry for the task may be created. At step 316, the status of the task may be updated to "waiting." After step 316, the method may end.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Figure 4:
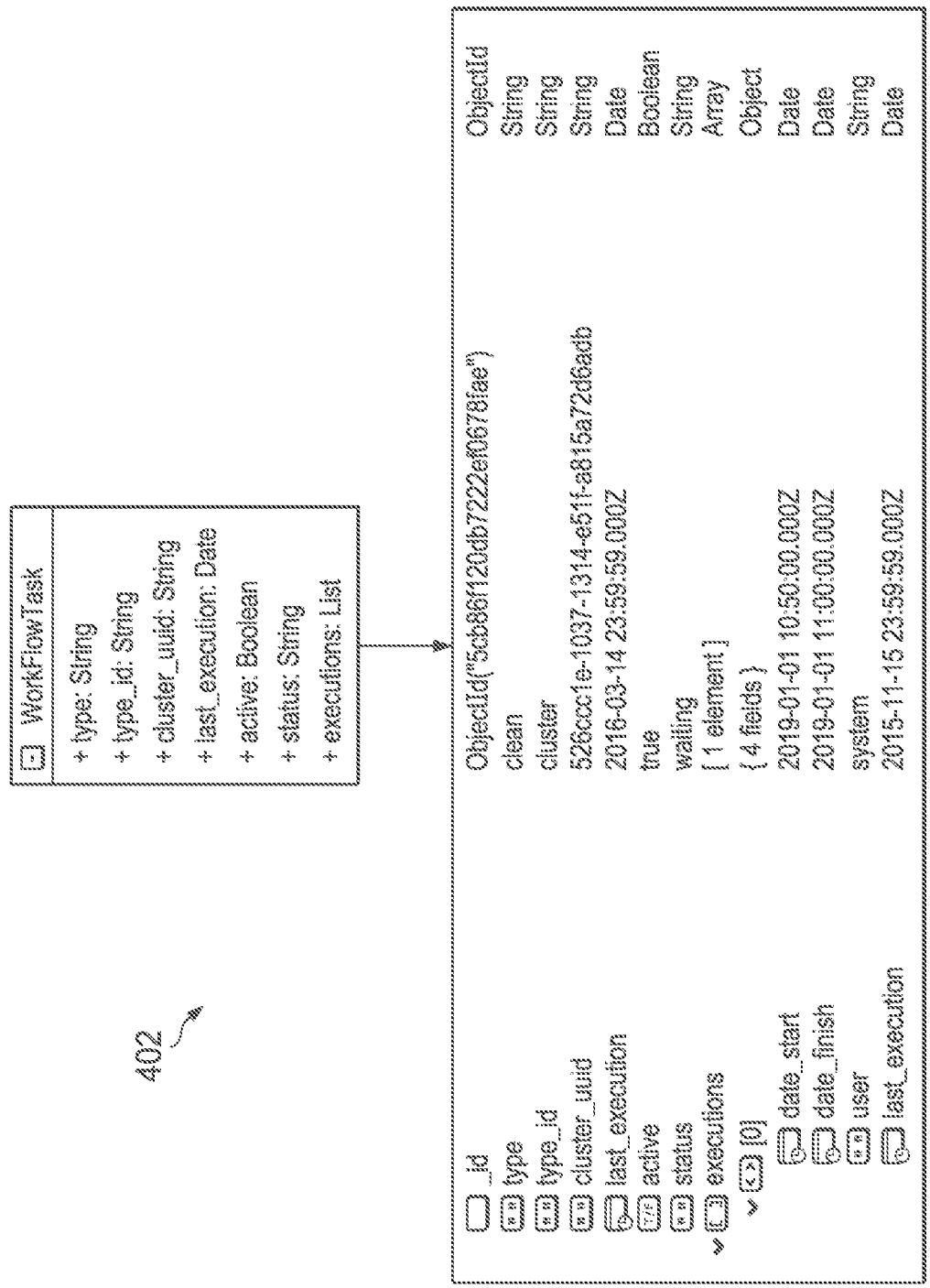
FIG. 4 illustrates an example schema for a workflow task, in accordance with embodiments of the present disclosure.

Turning now to FIG. 4, an example schema 402 for a workflow task is shown. One of ordinary skill in the art with the benefit of this disclosure will appreciate that the data illustrated in FIG. 4 is merely one example of the types of data that might be included in such a schema.

Figure 5:
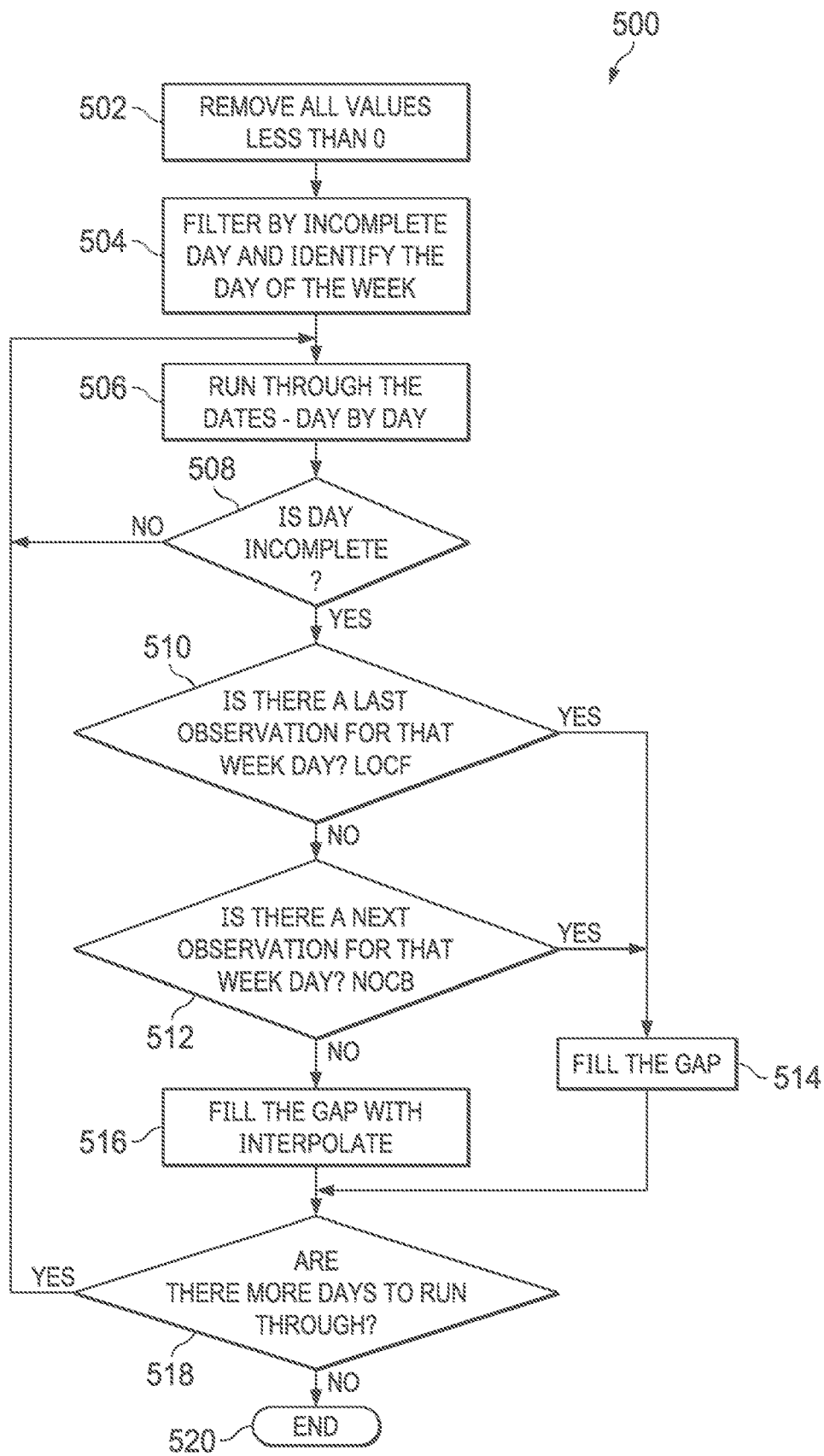
FIG. 5 illustrates an example method, in accordance with embodiments of the present disclosure.

Turning now to FIG. 5, another flow chart is shown of an example method 500 for operating a machine learning data cleaning system, in accordance with some embodiments of this disclosure. At step 502, as noted above, all values less than zero may be removed from the data. (In some embodiments, the data may reflect quantities for which negative values are meaningful, and so this step may be omitted.)

At step 504, the data may be filtered to identify days having incomplete data. In particular, this may be accomplished at steps 506, 508, and 518 by looping through all of the available days and examining the data to see if it is incomplete.

For any incomplete days, the method may proceed to step 510. If there is at least one earlier observation for the same day of the week, then the most recent such observation may be used to fill in the gap. This is referred to as last observation carried forward (LOCF).

If there is no corresponding earlier observation, then at step 512, the method may look for a later observation for the same day of the week. If at least one later observation is found, the earliest such observation may be used to fill in the gap. This is referred to as next observation carried backward (NOCB).

In other embodiments, instead of looking for prior days and then later days, the method may look for later days and then prior days. In these and other embodiments, other variations are also possible. For example, the method may exhibit a preference for days that are closer to the missing data, regardless of whether such days fall before or after the missing data.

If steps 510 and 512 both fail to find a corresponding observation, then the gap may be filled via an interpolation method at step 516. For example, linear interpolation, polynomial interpolation, spline interpolation, or any other suitable method may be employed.

The method may then loop at step 518 until all days have been examined, and all missing data has been filled in. The method may then end at step 520.

One of ordinary skill in the art with the benefit of this disclosure will understand that the preferred initialization point for the method depicted in FIG. 5 and the order of the steps comprising that method may depend on the implementation chosen. In these and other embodiments, this method may be implemented as hardware, firmware, software, applications, functions, libraries, or other instructions. Further, although FIG. 5 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Thus according to some embodiments, gaps in a data set may be filled before training a machine learning model to obtain a better result. As described herein, embodiments of this disclosure may effectively fill such gaps using a mix of different techniques as appropriate.

Without a solution such as the embodiments described herein, it would be necessary to write dozens or hundreds of lines of code to treat each of the problems described above. The standardized solutions described herein may be used to fill in the gaps in many different types of data (e.g., time-series data) in a more agile way than has heretofore been possible.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    at least one processor; and
    a non-transitory memory coupled to the at least one processor;
    wherein the information handling system is configured to:
    receive time-series data regarding measurements of a physical variable;
    determine that a missing data point is missing from the time-series data, wherein the missing data point corresponds to a particular day of the week;
    in response to a determination that earlier corresponding data from the particular day of the week of an earlier week is available, copy the earlier corresponding data to replace the missing data;
    in response to a determination that later corresponding data from the particular day of the week of a later week is available, copy the later corresponding data to replace the missing data; and
    in response to a determination that neither the earlier corresponding data nor the later corresponding data is available, perform interpolation to replace the missing data.

2. The information handling system of claim 1, wherein the time-series data comprises telemetry data of a target information handling system.

3. The information handling system of claim 2, wherein the telemetry data relates to a variable selected from the group consisting of: temperature, fan speed, vibration level, CPU utilization, memory utilization, and disk utilization.

4. The information handling system of claim 2, wherein the telemetry data is received from a software agent executing on the target information handling system.

5. The information handling system of claim 1, wherein the information handling system is further configured to determine that the missing data is of a missing completely at random (MCAR) type.

6. The information handling system of claim 5, wherein the determination of the MCAR type is based on a user input.

7. A method comprising:
    an information handling system receiving time-series data regarding measurements of a physical variable;
    the information handling system determining that missing data points are missing from the time-series data, wherein the missing data points correspond to particular days of the week; and
    for each missing data point of the missing data points, the information handling system:
    in response to a determination that earlier corresponding data from the particular day of the week of an earlier week is available, copying the earlier corresponding data to replace the missing data;

in response to a determination that later corresponding data from the particular day of the week of a later week is available, copying the later corresponding data to replace the missing data; and in response to a determination that neither the earlier corresponding data nor the later corresponding data is available, performing interpolation to replace the missing data.

8. The method of claim 7, further comprising removing data points from the time-series data that have negative values.

9. The method of claim 7, wherein the time-series data comprises telemetry data of a target information handling system.

10. The method of claim 9, wherein the telemetry data relates to a variable selected from the group consisting of: temperature, fan speed, vibration level, CPU utilization, memory utilization, and disk utilization.

11. The method of claim 9, wherein the telemetry data is received from a software agent executing on the target information handling system.

12. The method of claim 7, further comprising determining that the missing data is of a missing completely at random (MCAR) type.

13. The method of claim 12, wherein the determination of the MCAR type is based on a user input.

14. An article of manufacture comprising a non-transitory, computer-readable medium having computer-executable code thereon that is executable by an information handling system for:

receiving time-series data regarding measurements of a physical variable;

determining that a missing data point is missing from the time-series data, wherein the missing data point corresponds to a particular day of the week;

in response to a determination that earlier corresponding data from the particular day of the week of an earlier week is available, copying the earlier corresponding data to replace the missing data;

in response to a determination that later corresponding data from the particular day of the week of a later week is available, copying the later corresponding data to replace the missing data; and in response to a determination that neither the earlier corresponding data nor the later corresponding data is available, performing interpolation to replace the missing data.

15. The article of claim 14, wherein the time-series data comprises telemetry data of a target information handling system.

16. The article of claim 15, wherein the telemetry data relates to a variable selected from the group consisting of: temperature, fan speed, vibration level, CPU utilization, memory utilization, and disk utilization.

17. The article of claim 15, wherein the telemetry data is received from a software agent executing on the target information handling system.

18. The article of claim 14, wherein the information handling system is further configured to determine that the missing data is of a missing completely at random (MCAR) type.

19. The article of claim 18, wherein the determination of the MCAR type is based on a user input.

* * * * *